United States Patent [19]

Wright

[11] Patent Number: 5,212,750

[45] Date of Patent: May 18, 1993

[54] FIBER OPTIC HARNESS HAVING REDUCED WEIGHT AND BULK, AND METHOD

[75] Inventor: James R. Wright, Chenango County, N.Y.

[73] Assignee: Simmonds Precision Engine System, Inc., Akron, Ohio

[21] Appl. No.: 897,649

[22] Filed: Jun. 12, 1992

[51] Int. Cl.$^5$ .......................... G02B 6/00; G02B 6/36
[52] U.S. Cl. ...................... 385/69; 385/113; 385/86
[58] Field of Search ............ 385/113, 77, 78, 76, 385/69, 86

[56] References Cited

U.S. PATENT DOCUMENTS

| | | | |
|---|---|---|---|
| 3,457,000 | 7/1969 | Genahr | 385/86 X |
| 4,493,529 | 1/1985 | Doty | 385/69 |
| 4,773,726 | 9/1988 | Ito | 385/69 X |
| 4,789,218 | 12/1988 | Paul et al. | 385/69 X |
| 4,813,754 | 3/1989 | Driaroggia | 385/86 X |

Primary Examiner—Akm E. Ullah
Attorney, Agent, or Firm—William E. Zitelli; Don W. Bulson

[57] ABSTRACT

A fiber optic harness assembly having reduced weight and bulk comprises a plurality of optical fibers and loose tube protective buffers therefor. At least two of the optical fibers and corresponding buffers are routed commonly along a first branch of the harness and respectively along the second and third branches of the harness. Similarly, strength elements extending parallel to corresponding optical fibers are routed commonly along the first branch to the intersection whereat the strength elements are divided into separate portions for extension respectively along the second and third branches. The strength elements and buffered optical fibers coextending along the harness branches are surrounded and held bundled together in contiguous relationship by respective branch portions of an outer jacket or sheath. The ends of the branches are terminated by connectors which have provision for terminating the strength elements to a connector body independently of optical contacts at the ends of the optical fibers, thereby to isolate the optical contacts from mechanical loads applied to the harness. The harness assembly can be repaired by detaching the optical contact from the end of the optical fiber to be repaired, withdrawing the optical fiber from the protective buffer, inserting a new optical fiber into the protective buffer, and connecting an optical contact to one or both ends of the new optical fiber.

24 Claims, 2 Drawing Sheets

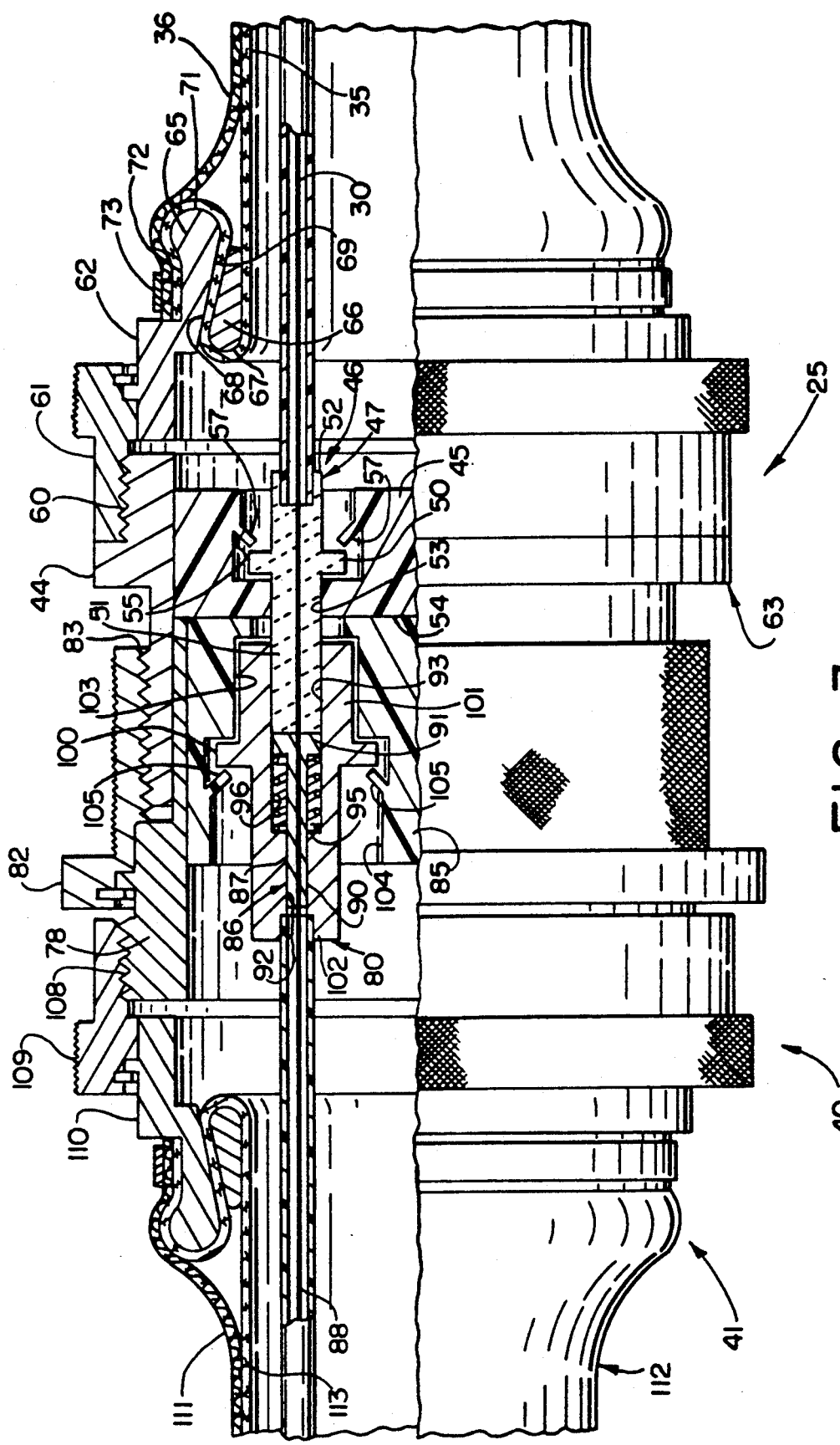

FIBER OPTIC HARNESS HAVING REDUCED WEIGHT AND BULK, AND METHOD

The invention herein described relates generally to cable transmission systems and methods and, more particularly, to fiber optic cables and harnesses, terminations therefor, and methods of assembly and repair thereof. The invention also has application to electrical and combined electrical and fiber optic cables and harnesses.

BACKGROUND

Various fiber optic harnesses heretofore have been used in a variety of applications. Harness constructions have been as simple as a specific length of fiber optic cable with a single connector or other termination device on each end. A typical single element cable comprises an optical fiber consisting of a light conducting core together with an integral cladding that is used to convey an optical signal. The optical fiber is surrounded by a tubular protective buffer which provides protection for the relatively fragile optical fiber. Usually, the protective buffer tightly encapsulates the clad optical fiber core in much the same way that electrical insulation typically encapsulates a conventional electrical wire conductor, this essentially restricting any movement of the optical fiber relative to the buffer. However, it is also known to use a buffer that loosely surrounds the optical fiber with sufficient clearance to permit some limited movement of the optical fiber relative to the buffer.

Fiber optic cables also have included a strength member that extends along the length of the cable for carrying the mechanical loads to which the cable may be subjected, thereby to prevent the optical fiber from being stressed to a point of degraded performance. The strength member usually is a flexible, relatively inextensible element or elements such as, for example, aramid or fiberglass fibers.

The buffered optical fiber and, if provided, the strength member are surrounded by an outer covering or jacket which functions to protect the interior components of the cable from the environment, e.g., from abrasion, water, oil, etc. The jacket may be formed by a heat-shrunk or extruded tube which holds together the interior cable components with a tight fit, or the jacket may be in the form of a sheath of woven or braided material wrapped around the interior components of the cable.

More complex harness configurations have been provided such as a fiber optic cable including multiple optical fibers within a common tubular protective buffer or a cable with multiple optical fibers each having its own tubular protective buffer bundled with a common strength member within an outer jacket. Still other harness configurations include multiple cables contained within a harness jacket, each cable having its own protective buffer, strength member and jacket along with an optical fiber. At the ends of the cables, connectors are installed for connecting the cable ends to other optical devices such as other harnesses, optical components, etc. The connectors may be separate and individualized, one for each optical fiber, or they may be multiple contact or channel connectors, wherein optical contacts on the ends of multiple optical fibers are mounted together in a common connector housing.

In more complex harness configurations wherein the number of locations to be interconnected by a single harness may be three or more, electrical wiring harness constructions have been emulated. In a typical harness construction, fiber optic cables each consisting of an optical fiber, buffer, strength member and jacket are routed along respective branches between respective locations. At the branch ends the fiber optic cables are terminated by respective connectors.

In many of the applications in which fiber optic harnesses may be used, such as in aircraft systems, the weight and bulk of the harnesses are important considerations. It would be advantageous to provide a fiber optic harness construction having reduced weight and bulk, while still achieving desired performance, strength and durability characteristics.

Another problem associated with known fiber optic harnesses of any complexity is the difficulty of repairing the harness should one or more of the fiber optic circuits therein be found defective after assembly or become damaged in use. To repair the fiber optic harness, in many cases the harness would have to be disassembled and removed from its installation site, after which the outer jacket would be stripped or cut away to permit replacement of a defective or damaged optical fiber and/or protective buffer. After the replacement had been effected, a new jacket would then have to be reapplied. Consequently, the repair procedure could be a relatively time consuming and costly venture, and in many instances would dictate scrapping the harness rather than attempting to repair it. It would be advantageous to provide a fiber optic harness and method that facilitates repair of one or more fiber optic circuits in the harness.

Another consideration is that of maintaining accurate alignment between the optical contacts in one connector with corresponding contacts in a mating connector. A problem encountered in the past is that mechanical loads acting on the harness have placed stresses on the contacts that could disturb the optical alignment, as by tilting one contact relative to its mating contact, and thereby cause undesirable optical transmission losses. Consequently, it would be advantageous to provide a connector and harness interface wherein the contacts are isolated from mechanical loads acting on the harness.

SUMMARY OF THE INVENTION

The present invention provides an innovative fiber optic harness assembly and method that addresses the above considerations and problems. Moreover, some aspects of the invention have broader application to other types of harnesses such as electrical harnesses and electrical/optical harnesses, as will be appreciated by those skilled in the art upon the reading of this specification.

According to one aspect of the invention, there is provided a fiber optic harness assembly having reduced weight and bulk when compared to conventional harnesses having similar performance, strength and durability characteristics. The fiber optic harness assembly, which has at least first, second and third branches meeting at an intersection, comprises a plurality of optical fibers and tubular protective buffers therefor. At least two of the optical fibers and corresponding buffers are routed commonly along the first branch and respectively along the second and third branches. Similarly, strength elements extending parallel to corresponding optical fibers are routed commonly along the first branch to the intersection whereat the strength elements are divided into separate portions for extension respectively along the second and third branches. The strength elements and buffered optical fibers coextending along the harness branches are surrounded and held bundled together in contiguous relationship by respective branch portions of an outer jacket or sheath. That is, the commonly extending buffers and strength elements are held bundled together without any intervening internal jackets or sheathes surrounding respective fibers, buffers and strength elements, thereby obtaining a significant reduction in weight and bulk while still affording desired strength, performance and durability characteristics.

According to another aspect of the invention, a fiber optic harness assembly comprises a fiber optic harness and a multiple channel connector at least at one end of the harness for optically and mechanically connecting the end of the harness to an external member. The harness includes a plurality of optical fibers, respective tubular protective buffers surrounding the optical fibers, an outer protective sheath surrounding the protective buffers, and a tensile load bearing member extending parallel to the protective buffers and commonly bundled therewith by the outer protective sheath. The connector includes respective optical contacts connected to the ends of the optical fibers, a connector body supporting the optical contacts and having associated therewith means for coupling the connector body to the external member, and means for terminating the tensile load bearing member to the connector body independently of the optical contacts, thereby to isolate the optical contacts from mechanical loads applied to the harness.

According to still another aspect of the invention, a fiber optic harness assembly comprises a fiber optic harness and a multiple channel connector at least at one end of the harness for optically and mechanically connecting the end of the harness to an external member. The harness includes a plurality of tubular protective buffers, a plurality of optical fibers extending through the protective buffers and loosely slip-fitted within the protective buffers such that the optical fibers can be inserted into and withdrawn from the protective buffers, and an outer protective sheath surrounding the protective buffers. The connector includes respective optical contacts connected to the ends of the optical fibers, and a connector body supporting the optical contacts and having associated therewith means for coupling the connector body to the external member. The connector body supports the optical contacts in a predetermined arrangement for optical coupling to respective optical elements in the external member. Such a construction facilitates assembly and/or repair of the harness assembly.

The invention further provides a method of repairing a fiber optic harness assembly that includes a fiber optic harness and a connector at least at one end of the harness for optically and mechanically connecting the end of the harness to an external member, the harness including a tubular protective buffer, an optical fiber extending through the protective buffer and loosely slip-fitted within the protective buffer such that the optical fiber can be inserted into and withdrawn from the protective buffer, and an outer protective sheath surrounding the protective buffer, and the connector including an optical contact connected to an end of the optical fiber, and a connector body supporting the optical contact and having associated therewith means for coupling the connector body to the external member. The method comprises the steps of (a) detaching the optical contact from the end of the optical fiber, (b) withdrawing the optical fiber from the protective buffer, (c) inserting a new optical fiber into the protective buffer, and (d) connecting an optical contact to one or both ends of the new optical fiber.

The invention also provides a method of assembling a fiber optic harness assembly, the method comprising the steps of (a) laying out a plurality of tube buffers and strength elements in a configuration corresponding to a predetermined interconnection schematic for the routing of optical circuits, (b) then applying a jacket around the coextending tube buffers and strength elements to hold them bundled together, and (c) then inserting optical fibers into respective tube buffers.

According to still another important aspect of the invention, a harness assembly comprises a harness and a connector for terminating an end of the harness. The harness includes at least one conductive element and a tensile strength member extending along the length thereof. The connector includes a housing having a rearward opening through which the one conductive element and tensile strength member extend into the connector housing, and a strain relief ring positioned interiorly of the connector housing and cooperative therewith to anchor the tensile strength member to the connector housing. The tensile strength member extends between an outer surface of the strain relief ring and an inner surface of the housing and around an axially inner edge of the strain relief ring, and the inner surface of the housing is tapered relative to the axis of the strain relief ring such that an axial load on the tensile strength member will urge the strain relief ring rearwardly to tightly clamp the tensile strength member between the strain relief ring and the tapered inner surface of the connector housing.

The foregoing and other features of the invention are hereinafter described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 3 is a cross-sectional view through a representative connector at an end of one of the branches of the harness assembly.

DETAILED DESCRIPTION

Figure 1:
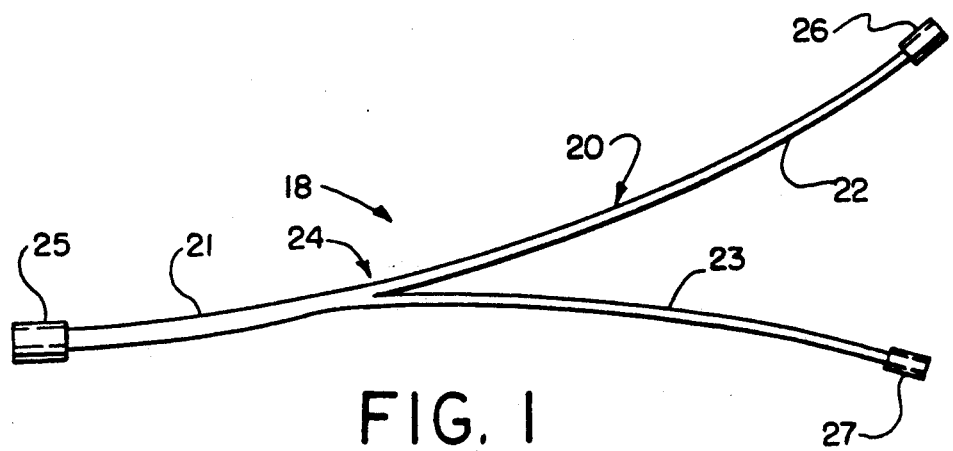
FIG. 1 is a schematic illustration of a harness assembly according to the invention.

Referring now in detail to the drawings and initially to FIG. 1, a fiber optic harness assembly according to the invention is schematically illustrated 18. The illustrated harness assembly 18 is intended to transmit optical signals between three different locations and, consequently, includes a harness configured with three branches 21-23 which meet at an intersection 24. The ends of the harness branches 21-23 are terminated by respective connectors 25-27 of the harness assembly 18 for coupling to mating connectors of the several components to be interconnected by the harness assembly.

Figure 2:
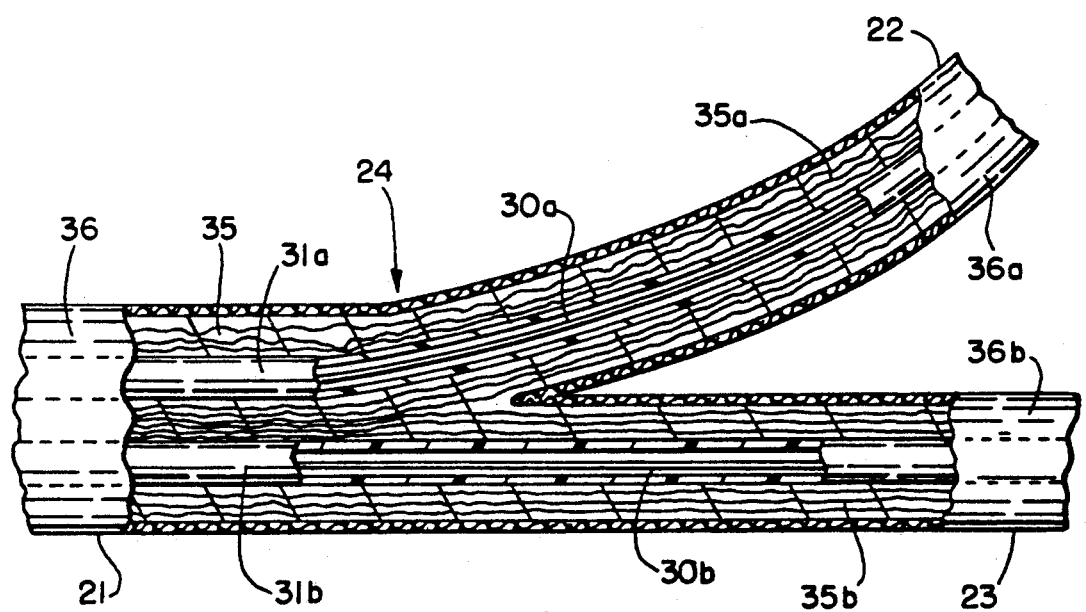
FIG. 2 is a fragmentary view of the harness assembly of FIG. 1, which is shown partly broken away in section to illustrate interior components of the harness assembly and their routing along the branches of the harness assembly.

Referring now to FIG. 2, the harness 20 comprises a plurality of optical fibers, two of which are shown and designated by reference numerals 30a and 30b. Although only two optical fibers are shown for the sake of clarity, the number and routing thereof may be varied as desired. In this regard, the optical fibers 30a and 30b are each representative of one or more optical fibers.

The optical fibers 30a and 30b may be of conventional type including a core and its integral cladding. The optical fibers 30a and 30b are surrounded by tubular protective buffers 31a and 31b which function to protect the optical fibers from damage or deterioration. The buffers preferably loosely surround the optical fibers for reasons discussed hereinafter in connection with the assembly and repair of the harness 20.

In the harness branch 21 the optical fibers 30a and 30b and their corresponding buffers 31a and 32b are commonly bundled together along with a strength member 35 by an outer jacket or jacket portion 36. The strength member 35 preferably is in the form of a flexible yet inextensible tensile strength element or elements, such as aramid, fiberglass or carbon fibers, which extend parallel to the corresponding optical fiber or fibers. A preferred strength member is a tow of nickel plated graphite fibers, such material being available from Hercules, Inc. of Wilmington, Del. under the mark Magnamite and from American Cyanamid Co. of Wayne, N.J. The strength elements or fibers function to carry any mechanical loads, and in particular tensile loads, to which the harness may be subjected during use, thereby to prevent such loads from negatively impacting the optical fibers and their transmission characteristics.

At the intersection 24, the optical fibers 30a and 30b and their corresponding buffers 31a and 32b are routed along respective branches 22 and 23 of the harness. Similarly, the inextensible strength elements 35 are divided for routing along with the buffered optical fibers along the harness branches 22 and 23. The buffered optical fibers and strength members extend along the harness branches and terminate at the respective connectors 25-27. Accordingly, the buffered optical fiber 30a and a corresponding portion 35a of the strength member extend from connector 25 to connector 26 whereas buffered optical fiber 30b and a corresponding portion 35b of the strength member extend between the connector 25 and connector 27.

Each branch 22 and 23 has its own outer jacket or jacket portion 36a and 36b, respectively, which hold together the interior components, i.e., the buffered optical fibers and strength member portions, and protect the interior components from abrasion and other environmental conditions. The jacket may be in the form of a sheath of woven or braided material which may be loosely although preferably tightly wrapped around the interior components. As an alternative, the jacket may be extruded or formed by shrink tubing for jacketing the harness branches and a shrink boot of an appropriate configuration at each intersection.

As above mentioned, the harness branches 21-23 are terminated by respective connectors 25-27. In FIG. 3, the connector 25 is illustrated as a representative connector according to the invention, along with a mating connector 40 mounted to an end of another cable or harness branch 41 in the hereinafter described preferred manner. The other connectors may be of the same or another type, although preferably incorporating the hereinafter described arrangement for terminating the optical fiber or fibers and the strength element or elements of the strength member 35. Exemplary types of connectors and optical contacts to which the invention may be applied are available from ITT Cannon, Amphenol-Bendix Connector Operations, and Raychem Corporation, all well known suppliers in the industry.

The connector 25 comprises a main tubular metal shell or casing 44 which carries interiorly thereof a central contact supporting insert or body 45 of molded dielectric material such as, for example, phenolic or fluoropolymer. The insert 45 in turn carries one or more male optical pin contacts 46 terminating a corresponding optical fiber or fibers 30. The illustrated pin contact 46 is intended to be representative of any number of like pin contacts supported in the insert 45.

As is conventional, the optical pin contact 46 is formed by a body 47, commonly made of a ceramic material, that includes an axially extending center passage in which a corresponding optical fiber 30 is secured as by bonding with a suitable bonding agent such as a conventionally used epoxy. As illustrated, the optical fiber extends to and flush with the front face of the contact body for abutment with the end of an optical fiber of a mating optical contact or other optical device.

The contact body 47 has an annular flange or collar 50 located between cylindrical front and rear portions 51 and 52. The front portion 51 is received in a hole 53 in the insert 45 and extends axially forwardly from the front face 54 of the insert, which front face is spaced axially inwardly from the front end of the casing 44. The hole 53 has an enlarged diameter rear portion or counterbore 55 diametrically sized to receive the collar 50. The counterbore 55 has disposed therein a releasable retention mechanism in the form of resilient fingers 57 that may be formed integrally with the insert as shown or, if desired, as a separate part secured to the insert. The resilient fingers are normally forwardly and inwardly sloped relative to the axis of the contact body to engage the back side of the collar 50 thereby to axially trap the collar between the fingers and bottom shoulder surface of the counterbore and hence retain the optical pin contact in the insert.

Although primarily functioning to hold the optical pin contact 46 in the insert 45, the resilient fingers 57 also permit easy removal of the optical pin contact from the insert, as may be necessary for replacing a damaged or defective optical fiber in the hereinafter described manner. That is, the resilient fingers may be radially outwardly flexed, such as by a concentric tool inserted into the counterbore from the back side of the insert, to positions that clear the collar, whereupon the optical pin contact may be rearwardly axially withdrawn from the insert. When the optical pin contact is to be reinstalled in the insert, it need only be axially inserted into the insert from the rear, the collar acting upon the sloped fingers to cam them radially outwardly until axially clear of the collar at which point they will radially inwardly spring back to engage the outer side of the collar.

The casing 44 has at its rear end external threads 60 for receiving a correspondingly internally threaded nut 61 rotatably carried on a backshell 62. As shown, the outer jacket 36 of the harness is terminated to the backshell which may be uncoupled and pulled back from the casing 44 to gain access to the optical contacts for assembly, inspection, repair, etc. When coupled together, the casing 44 and backshell 62 form a housing 63 for protecting the unjacketed end portions of the optical fibers as well as for containing the internal components of the connector.

Along with the outer jacket 36, the strength elements 35 are terminated to the backshell 62 for transfer of tensile loads from the harness to the connector housing independently of the optical contacts. The strength elements are preferably assembled to the connector with a slight pre-load to avoid stressing the optical fibers. That is, the strength elements are shorter in relation to the corresponding optical fibers such that upon tensioning of the harness the strength elements will be placed in tension before any of the load can be applied to the optical fibers. The strength members also preferably go into tension before the jacket 36 to avoid stretching of the jacket and the problems associated therewith.

Respecting termination of the strength elements 35, the backshell 62 has a rearward tubular projection 65 through which the buffered optical fibers 30 and strength elements 35 pass into the interior of the connector housing 63. Also provided is a strain relief ring 66 positioned interiorly of the tubular projection 65 and cooperating therewith to anchor the strength elements 35 to the connector housing 63. The strength elements extend forwardly through the strain relief ring, then around an axially inner or forward edge 67 of the strain relief ring, and then rearwardly between an outer surface 68 of the strain relief ring and an inner surface 69 of the tubular projection. The ends of the strength elements continue around the rear edge 71 of the tubular projection and are fixed, along with the end of the jacket 36, to a cylindrical outer clamping surface 72 of the tubular projection by a retention band 73, such as a band normally used to retain a jacket on a backshell. As shown, the end of the jacket is radially expanded to fit around the tubular projection and over the ends of the strength elements, and the retention band is cinched therearound.

The inner surface 69 of the tubular projection 65 is tapered relative to the axis of the tubular projection such that an axial load on the tensile strength elements 35 will urge the strain relief ring 66 rearwardly to tightly clamp the strength elements between the strain relief ring and the tapered inner surface 69 of the tubular projection. Preferably the outer surface 68 of the strain relief ring is correspondingly tapered to provide a wide area over which the strength elements are clamped between the backshell 62 and strain relief ring 68. This tapered interface between the strain relief ring and inner surface of the tubular projection function to securely anchor the strength elements to the backshell with a self tightening feature. That is, a load on the harness trying to pull the harness from the connector backshell will urge the strain relief ring rearwardly into tighter wedged engagement with the inner surface of the tubular projection, thereby increasing the clamping force acting on the strength elements. Accordingly, the greater the tensile load trying to pull the harness from the connector backshell, the tighter the strength elements will be clamped to the backshell.

As above indicated, preferably graphite fibers are used as the tensile strength elements. Graphite fibers, like many strength member fibers are sensitive to breakage under tension if bent at too sharp of angle. This problem is avoided in the illustrated anchoring configuration by the provision of large radii over which the strength elements 35 are wrapped. More particularly, the front or inner edge 67 of the strain relief ring 66 is provided with a large radius as is the rear edge 71 of the tubular projection 65. For nickel plated graphite fibers and similar fibers, the radius of the bend preferably is at least about 0.062 inch, this radius corresponding to a sharp drop off in strength as the radius is decreased below this value.

Still referring to FIG. 3, the mating connector 40 includes a main shell or casing 78 having a forward end portion which is telescopically receivable within the forward end portion of the casing 44 of the connector 25. Although not shown, the forward end portions of the two casings 78 and 44 may be provided with axially extending keys and keyways for preventing relative rotation about their axes when telescoped together. The corresponding keys and keyways also would function as alignment devices for aligning the optical pin contact or contacts of the connector 25 with a corresponding receptacle or receptacles 80 in the connector 40.

To maintain the two casings engaged, the casing 78 of the connector 40 rotatably carries a coupling nut 82 which is internally threaded for receiving external threads 83 on the forward end portion of the casing 44 of the connector 25. During mating of the two connectors, the casings 78 and 44 of the two connectors 40 and 25 will be initially partially telescoped to start the coupling nut 82 on the external threads 83 of the casing 44, after which the coupling nut may be rotated to pull together the two casings into fully mated position as shown.

The casing 78 of the connector 40 carries internally thereof a receptacle supporting insert or body 85. The insert 85 in turn carries one or more of the contact receptacles 80 for receiving a corresponding optical pin contact or contacts 46 of the connector 25.

The contact receptacle 80 has an optical contact 86 mounted therein for telescopic axial movement. The optical contact 86 is formed by a body 87, commonly made of a ceramic material, that includes an axially extending center passage in which a corresponding optical fiber 88 is secured as by bonding with a suitable bonding agent such as a conventionally used epoxy. As illustrated, the optical fiber 88 extends to and flush with the front face of the contact body for abutment with the end of the optical fiber 30 of the mating optical pin contact 46.

The contact body 87 has a cylindrical rear portion 90 and a relatively large diameter flange or head portion 91 at its forward end. The rear and head portions 90 and 91 of the contact body 87 are respectively received for guided axial movement in correspondingly sized rearward and forward portions 92 and 93 of a center through passage in the receptacle 80. The rearward and forward portions of the center passage form a shoulder 95, and a spring 96 is interposed between the shoulder 95 and the head portion 91 of the optical contact thereby to resiliently forwardly bias the optical contact.

When the connectors 25 and 40 are mated, the forwardly projecting end of each optical pin contact 46 of the connector 25 will telescope into the corresponding contact receptacle 80. As the optical pin contact telescopes into the receptacle, the front face thereof will abut the front face of the optical contact 86. Once engaged, further telescopic insertion of the optical pin contact 46 will push the optical contact 86 rearwardly against the biasing force of the spring 96, which biasing force will serve to hold the contacts together with their abutting faces flush against one another. Also, the ends of the optical fibers 30 and 88 in the two contacts 46 and 86 will be precisely aligned with respect to one another by reason of the close telescopic interfit between the optical pin contact 46 and the receptacle 80. In this regard, the forward end portion 51 of the optical pin contact 46 and the head portion 91 of the optical contact 86 both have a close tolerance fit within the forward portion 93 of the center passage in the receptacle to ensure precise alignment of the optical fiber ends.

The receptacle 80 has an annular flange or collar 100 located between cylindrical front and rear portions 101 and 102 of the receptacle. The front end portion 101 is received in a hole 103 in the insert 85 that opens to the front face of the insert. The hole 103 has an enlarged diameter rear portion or counterbore 104 diametrically sized to receive the collar 100. The counterbore has disposed therein a releasable retention mechanism in the form of resilient fingers 105 that may be formed integrally with the insert as shown or as a separate part secured to the insert. The resilient fingers 105 are normally forwardly and inwardly angled to engage the backside of the collar thereby to axially trap the collar between the fingers and bottom shoulder surface of the counterbore and hence retain the optical contact in the insert. While functioning to hold the optical contact in the insert, the resilient fingers also permit easy removal of the receptacle from the insert, in essentially the same above described manner that the optical pin contact 46 can be removed from the insert 45 of the connector 25.

Also like the connector 25, the casing 78 of the connector 40 has at is rear end external threads 108 for receiving a correspondingly internally threaded nut 109 rotatably carried on a backshell 110. The outer jacket 111 of the harness 112 including the optical fiber 88 and the strength elements 113 of the harness 112 may be terminated to the backshell 110 in the same manner as above described with respect to the connector 25.

Turning now to a preferred method for assembling the above described harness assembly 18, flexible tubes to be used as the loose tube buffers 31 are laid out in a branched configuration corresponding to the desired interconnection schematic for the routing of optical circuits. The strength elements, preferably high tensile, high modulus fibers, are similarly routed to provide mechanical reinforcement. In addition, electrical wires may also be included if a hybrid optic/electric harness is desired. The laid out components are then covered with a single common jacket having respective portions extending along the branches of the harness. The jacket preferably is a braided construction as braiding is generally more compatible with a branched harness construction. The braided harness also provides a convenient means to draw the harness components together into a small, tight bundle of relatively uniform diameter and cross-sectional shape. However, similar benefits can be achieved through use of shrink tubing for jacketing the harness branches and a shrink boot of an appropriate configuration at each intersection.

After the jacket has been applied, optical fibers may be routed through the loose tube buffers and terminated to an optical contact. The optical fibers are fed endwise into the loose tube buffers and this insertion procedure may be facilitated by the use of a lubricant and/or assisted by pressurized air. Preferably the leading end of the optical fiber is rounded to avoid having a sharp leading edge dig into the wall of the tubular buffer.

After the optical contacts have been assembled on the ends of the optical fibers (and any electrical contacts on the ends of electrical conductors included in a hybrid optic/electrical harness), the contacts are installed in the connectors. The backshell of each connector is then secured in place with a slight pre-load being placed on the strength members of the harness to avoid stressing the optical fiber.

By allowing the optical fibers to be installed after the other components of the harness have been laid up and assembled together, there is eliminated the chance that the optical fibers will be damaged during the harness assembly procedures. Moreover, the ability to install the optical fibers in an otherwise assembled cable provides an additional benefit by facilitating repair and/or replacement of individual optical fibers within the harness. If an optical fiber is damaged during use or if a poor optical connection is made within the terminating connector, repair can be implemented without having to totally disassemble the harness.

To effect a repair of an optical circuit in the harness, the backshells of the connectors at opposite ends of the defective optical circuit are removed to gain access to the optical contacts at the ends of the optical fiber requiring servicing. The optical contacts may then be removed from the corresponding connector inserts in the above-described manner and the optical contact at one end of the optical fiber is removed to allow the optical fiber to be withdrawn by pulling on the opposite end of the optical fiber. After the optical fiber has been withdrawn from its protective buffer, a new optical fiber may be inserted into the buffer and optical contacts assembled to the ends of the optical fiber. If it was necessary to cut the tube buffer as would be the case in the illustrated embodiment, a shrink tube extension of the buffer may be used to bridge the gap created by the shortening of the tube buffer. The optical contacts then are inserted into the corresponding openings in the connector inserts after which the backshells may be reinstalled on the connector casings to complete the repair process.

Although the invention has been shown and described with respect to a preferred embodiment, it is obvious that equivalent alterations and modifications will occur to others skilled in the art upon reading and understanding of this specification. As will be appreciated by those skilled in the art, one or more of the herein described features of the present invention may be used in a harness assembly. Moreover, some features are not specific to a fiber optic harness and hence have application in other types of harness including electrical harnesses and electrical/optical harnesses. The present invention includes all such equivalent alterations and modifications, and is limited only by the scope of the following claims.

What is claimed is:

1. A fiber optic harness assembly having at least first, second and third branches meeting at an intersection and comprising a plurality of optical fibers at least two of which are routed commonly along said first branch and respectively along said second and third branches; tubular protective buffers respectively surrounding said optical fibers; plural strength elements extending parallel to said optical fibers along said first branch and being divided at said intersection into separate portions for extension respectively along said second and third branches; and an outer protective sheath surrounding and holding together in contiguous relationship said protective buffers and strength members in each said branch.

2. A harness assembly as set forth in claim 1, wherein said strength elements include flexible, longitudinally inextensible fibers.

3. A harness assembly as set forth in claim 1, wherein said strength elements include carbon fibers.

4. A harness assembly as set forth in claim 1, wherein said optical fibers loosely fit within and are longitudinally movable relative to said protective buffers.

5. A harness as set forth in claim 1, comprising at least one connector on the end of at least one of said branches, said connector including a housing, means for mechanically coupling said housing to an external member, means for terminating at least one of said optical fibers in said housing for optical coupling to an optical device in the external member, and means for terminating at least some of said strength elements to said housing independently of said means for terminating said one of said optical fibers.

6. A fiber optic harness assembly comprising a fiber optic harness and a multiple channel connector at one end of said harness for optically and mechanically connecting said end of said harness to an external member; said harness including a plurality of optical fibers, respective tubular protective buffers surrounding said optical fibers, an outer protective sheath surrounding said protective buffers, and a tensile load bearing member extending parallel to said protective buffers and commonly bundled therewith by said outer protective sheath; and said connector including respective optical contacts connected to the ends of said optical fibers, a connector body supporting said optical contacts and having associated therewith means for mechanically coupling said connector body to the external member, and means for terminating said tensile load bearing member to said connector body independently of said optical contacts.

7. A harness assembly as set forth in claim 6, wherein said means for terminating includes a backshell removably mounted to said connector body.

8. A harness assembly as set forth in claim 7, wherein said backshell has a rearward tubular projection through which said optical fibers and load bearing member extend, and said means for terminating further including a strain relief ring positioned interiorly of said tubular projection and cooperative therewith to anchor said load bearing member to said backshell.

9. A fiber optic harness assembly comprising a fiber optic harness and a multiple channel connector at least at one end of said harness for optically and mechanically connecting said end of said harness to an external member; said harness including a plurality of tubular protective buffers, a plurality of optical fibers extending through said protective buffers and loosely slip-fitted within said protective buffers such that said optical fibers can be inserted into and withdrawn from said protective buffers, and an outer protective sheath surrounding said protective buffers; and said connector including respective optical contacts connected to the ends of said optical fibers, and a connector body supporting said optical contacts and having associated therewith means for coupling said connector body to the external member, said connector body supporting said optical contacts in a predetermined arrangement for optical coupling to respective optical elements in the external member.

10. A harness assembly as set forth in claim 9, wherein said connector body includes respective openings therein for supporting said optical contacts and means for releasably retaining said optical contacts in said openings.

11. A harness assembly as set forth in claim 10, wherein said means for releasably retaining includes a plurality of flexible fingers operable in a first position to retain said contacts in said openings and in a resiliently flexed position to permit withdrawal of said contacts from said openings.

12. A method of repairing a fiber optic harness assembly that includes a fiber optic harness and a connector at least at one end of the harness for optically and mechanically connecting the end of the harness to an external member, the harness including a tubular protective buffer, an optical fiber extending through the protective buffer and loosely slip-fitted within the protective buffer such that the optical fiber can be inserted into and withdrawn from the protective buffer, and an outer protective sheath surrounding the protective buffer, and the connector including an optical contact connected to an end of the optical fiber, and a connector body supporting the optical contact and having associated therewith means for coupling the connector body to the external member, said method comprising the steps of (a) detaching the optical contact from the end of the optical fiber, (b) withdrawing the optical fiber from the protective buffer, (c) inserting a new optical fiber into the protective buffer, and (d) connecting an optical contact to at least one end of the new optical fiber.

13. A method as set forth in claim 12, including the step of removing the optical contact from the connector body before detaching the optical contact from the optical fiber.

14. A method as set forth in claim 13, comprising the steps of removing a backshell from the connector body to obtain access to the optical contact for enabling removal of the optical contact from the connector body.

15. A method as set forth in claim 12, wherein the optical fiber is withdrawn from a protective buffer which extends along at least two branches of the harness which has at least three branches.

16. A harness assembly comprising a harness and a connector for terminating an end of said harness, said harness including at least one conductive element and a tensile strength member extending along the length thereof, and said connector including a housing having a rearward opening through which said one conductive element and tensile strength member extend into said connector housing, and a strain relief ring positioned interiorly of said housing and cooperative therewith to anchor said tensile strength member to said connector housing, said tensile strength member extending between an outer surface of said strain relief ring and an inner surface of said housing and around an axially inner edge of said strain relief ring, and said inner surface of said housing being tapered relative to the axis of said strain relief ring such that an axial load on the tensile strength member will urge the strain relief ring rearwardly to tightly clamp the tensile strength member between said strain relief ring and the tapered inner surface of said housing.

17. A harness assembly as set forth in claim 16, wherein said outer surface of said strain relief and said inner surface of said housing are correspondingly tapered.

18. A harness assembly as set forth in claim 17, wherein said axially inner edge of said strain relief ring is rounded.

19. A harness assembly as set forth in claim 16, wherein said housing has a tubular projection surrounding said opening, and said strength member extends around a rear edge of said tubular projection and is secured at its end around said tubular projection.

20. A harness as set forth in claim 19, wherein said rear edge of said tubular projection is rounded.

21. A harness assembly as set forth in claim 16, wherein said at least one conductive element includes an optical fiber.

22. A method of assembling a fiber optic harness assembly, the method comprising the steps of (a) laying out a plurality of tube buffers and strength elements in a configuration corresponding to a predetermined interconnection schematic for the routing of optical circuits, (b) then applying a jacket around the coextending tube buffers and strength elements to hold them bundled together, (c) then inserting optical fibers into respective tube buffers, (d) connecting to the ends of the optical fibers respective optical contacts, and (e) supporting the optical contacts in a predetermined arrangement in a connector body having associated therewith means for coupling the connector body to an external member.

23. A method as set forth in claim 22, wherein said inserting step includes using optical fibers that have rounded leading ends to avoid digging of the leading ends into the walls of the buffers.

24. A method as set forth in claim 22, wherein said inserting step includes using a lubricant or pressurized gas to assist insertion of the optical fibers into the tube buffers.

* * * * *